March 26, 1963  H. E. VIGOUR  3,083,323
NUMERICAL POSITIONING CONTROL SYSTEM
Filed Dec. 16, 1959  5 Sheets-Sheet 1

QUADRANTS

INVENTOR:
HERVEY E. VIGOUR,
BY Melvin M. Goldenberg
HIS ATTORNEY.

March 26, 1963

H. E. VIGOUR 3,083,323

NUMERICAL POSITIONING CONTROL SYSTEM

Filed Dec. 16, 1959

INVENTOR:
HERVEY E. VIGOUR,

BY Melvin M. Goldenberg
HIS ATTORNEY.

INVENTOR:
HERVEY E. VIGOUR,
BY *Melvin M. Goldenberg*
HIS ATTORNEY.

March 26, 1963  H. E. VIGOUR  3,083,323
NUMERICAL POSITIONING CONTROL SYSTEM
Filed Dec. 16, 1959  5 Sheets-Sheet 4

INVENTOR:
HERVEY E. VIGOUR,
BY Melvin M. Goldenberg
HIS ATTORNEY.

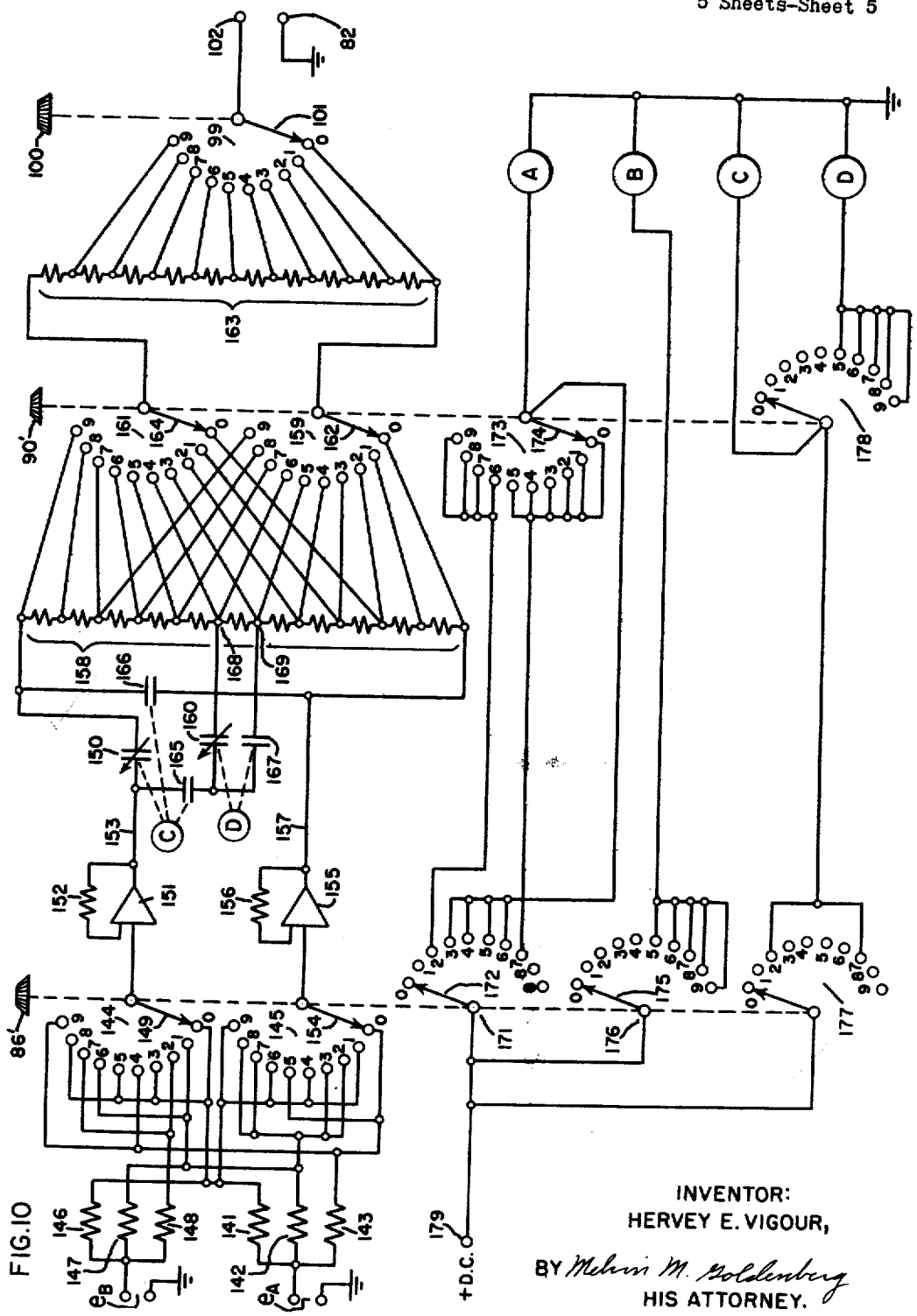

United States Patent Office 3,083,323
Patented Mar. 26, 1963

3,083,323
NUMERICAL POSITIONING CONTROL SYSTEM
Hervey E. Vigour, Waynesboro, Va., assignor to General
Electric Company, a corporation of New York
Filed Dec. 16, 1959, Ser. No. 859,913
12 Claims. (Cl. 318—28)

This invention relates to position control systems and more particularly to means for producing electrical signals corresponding to numerical input data and arrangements which utilize such electrical signals for positioning objects to correspond with the input data.

It is an object of the invention to provide an improved numerical data positioning control device.

A further object of the invention is to provide a simple position control signal generator which is capable of high resolution of numerical input data.

Another object of the invention is to provide a positioning system which permits substantially unlimited selection of position between adjacent coarse position stops in automatic positioning systems.

A still further object of the invention is to provide an improved position control system which operates on a single phase A.C. supply voltage and produces output signals which are compatible with the signals from control transformer selsyns.

Another object of the invention is to provide a control signal generator which has low level switching of input data signals.

A still further object of the invention is to provide improved arrangements for selecting predetermined portions of voltage signals representative of adjacent positions in a positioning system in order to derive a combined voltage which will indicate any decimal portion of the distance between the two adjacent positions.

Control signal devices have been provided which utilize two alternating current signals the magnitudes of which vary sinusoidally in accordance with the relative displacement of an object to be positioned or any quantity which is to be controlled. The sinusoidal variations in the magnitudes of the A.C. voltages are in a 90° phase relation and thus provide for one cycle of the sinusoidal variation four equally spaced positions at which the magnitudes are zero. The variation in magnitude of these A.C. voltages in the neighborhood of the zero magnitude position can be applied as an error signal with the proper sense to a servomechanism for the purpose of positioning the controlled device at a position corresponding to the zero magnitude position of the error voltage.

In order to improve the resolution of such systems the present invention provides for deriving a plurality of A.C. control signals the magnitude of which crosses the zero axis in the correct sense to permit the derived voltages to be used as error signals. In a digital decimal system, for example, the relative motion of the controlled objects between two adjacent positions established by a coarse positioning control system may be divided into ten equal increments which are digitally designated positions 0–9 inclusive. In order to derive the necessary control signal corresponding to any one of these digitally designated positions, predetermined portions of the two sinusoidal signals are vectorially combined to produce a sinusoidal signal which has a zero magnitude axis crossing at one point corresponding to the selected digital position between the two adjacent coarse positions. The increment between two such adjacent zero crossings is further subdivided by means of a suitable voltage dividing potentiometer which operates with respect to the potentials derived at two of the adjacent digital decimal positions. This potential is further subdivided by means of a further potentiometer to provide a third place decimal resolution of the error signal derived by the system.

The invention will be better understood from the following description taken in connection with the accompanying drawings and its scope will be defined in the claims.

In the drawings:

FIGURE 10 is a schematic wiring diagram of a modification for obtaining a position control voltage without using transformers in the circuit.

Figure 1:
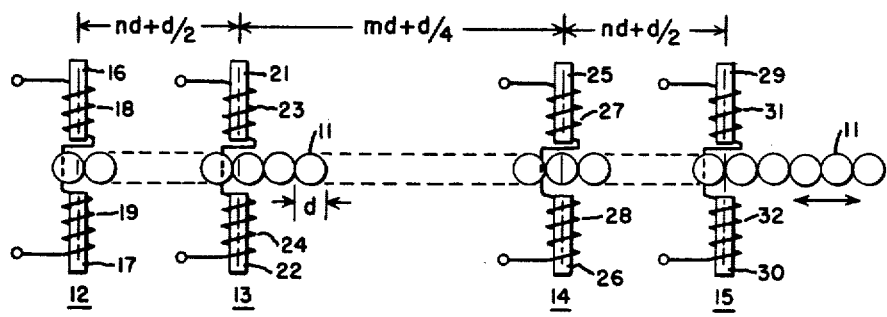
FIGURE 1 is a diagram of one arrangement for deriving phase displaced sinusoidal positioning signals.

The present invention operates with control signals derived from any suitable source which provides signals with characteristics equivalent to those derived from the position control system described in the application of John M. Rhoades entitled "Position Indicating Device," Serial No. 803,426, filed April 1, 1959, and assigned to the assignee of the present invention, and now Patent No. 3,010,063. An arrangement for deriving control voltages in a manner similar to the Rhoades application is shown in FIGURE 1 wherein a straight horizontal row of cylindrical pins 11 of a material such as soft iron is supported for relative movement with respect to magnetic transducers 12, 13, 14 and 15. The transducer 12 includes a pair of cores 16, 17, accurately positioned on opposite sides of the row of magnetic pins 11 and axially aligned normal to the plane of the pins 11. On the cores 16, 17 are wound coils 18, 19 respectively. The coils 18 and 19 are serially connected to supply the output signal of the transducer 12. In similar fashion the transducer 13 comprises cores 21, 22 which have wound thereon coils 23, 24; transducer 14 comprises cores 25, 26 having wound thereon coils 27, 28 and transducer 15 comprises cores 29, 30 upon which are wound coils 31, 32. The cores in practice may be U-shaped and the portions illustrated may be constituted by the legs of such U's.

As disclosed in the aforementioned application the transducers 12 and 13 are spaced apart an integral number of diameters of the magnetic cylinders 11 plus a half diameter in order to provide a signal of maximum magnitude variation as cylinders 11 move relative to the transducers 12 and 13. The transducers 14 and 15 are also spaced apart a distance including an integral number of diameters plus a half diameter of the pins 11. The spacing between transducers 13 and 14, however, is arranged to be an integral number of diameters of the rods 11 plus or minus one-fourth a diameter. This spacing is provided to produce a 90° phase relation between the signals derived from the transducers 12, 13 and transducers 14, 15.

Figure 2:
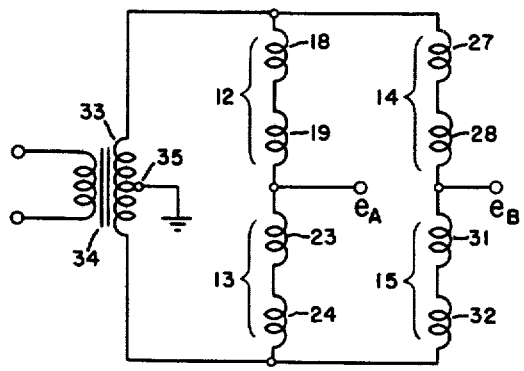
FIGURE 2 is a schematic wiring diagram showing the connection of the device of FIGURE 1.

Signal magnitudes which vary in quadrature representative of the relative motion of the pins 11 and the transducers 12–15 are obtained from the device of FIGURE 1. These signals are derived by connecting the transducers as indicated in FIGURE 2 with transducer 12 comprising series connected coils 18 and 19 serially connected with transducer 13 comprising coils 23 and 24 in series. In similar fashion coils 27 and 28 are connected in series with coils 31 and 32. The serially connected transducers 12 and 13 and transducers 14 and 15 are energized by being connected across an A.C. source such as provided by secondary winding 33 of the transformer 34 the primary of which may be connected to a suitable source such as a 400 cycle A.C. supply. The secondary 33 has a center tap 35. The circuit of FIGURE 2 operates as a bridge to supply the voltage $e_A$ at the junction of coils 19 and 23 relative to the center tap 35 and the voltage $e_B$ at the junction of coils 28 and 31 relative to the center tap 35. The voltages $e_A$ and $e_B$ are A.C. voltages of frequency corresponding to the input supply to the transformer 34 and have a magnitude and phase polarity relative to the center tap 35 which varies sinusoidally in accordance with relative position of the pins 11 and the transducers 12–15 shown in FIG. 1. The positive and negative positions of the sinusoidal variation mean that the A.C. signal is in-phase or out of phase with a reference phase fixed relative to the A.C. supply. The voltages $e_A$ and $e_B$ may be amplified, if desired, and are supplied to the resolving circuits hereinafter described.

Figure 3A:
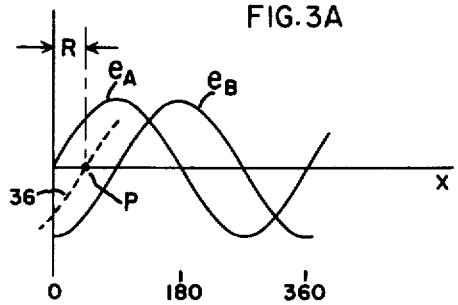
FIGURE 3A is a waveform diagram for describing the signals derived from the apparatus of FIGURES 1 and 2.

In a digital positioning system wherein the input data will be decimal in form it is convenient to designate the distances moved in terms of decimal portions of a unit of length and for this purpose the pins 11 in FIGURE 1 may be made 0.1 inch in diameter. This dimension indicated as "$d$" in FIGURE 1 could, of course, be any other convenient unit of measure. For pins 11 of a given diameter, the relative motion between the pins 11 and the transducers 12–15 corresponding to one pin diameter $d$ produces a complete cycle of amplitude variation in the voltages $e_A$ and $e_B$ as derived in the circuit of FIGURE 2. This variation of the magnitude of the voltages $e_A$ and $e_B$ is shown in FIGURE 3A where the $x$ axis corresponds to distance moved and a full cycle of the waveforms $e_A$ and $e_B$ corresponds to motion equal to one diameter $d$ in the system of FIGURE 1. In view of the spacing of the transducer pairs as shown in FIGURE 1 with an integral number of diameters plus one-fourth of one diameter between the transducer pairs, the magnitudes of the A.C. voltages derived vary as sinusoidal functions. These sinusoidal functions are in a 90° phase relation and may be expressed as $e_A = E \sin X$ and $e_B = -E \cos X$.

This sine function is bipolar in the region where it crosses the axis of zero magnitude having both positive and negative values. A servo system can be employed to operate with respect to an error voltage of this type to maintain a system in a null condition corresponding to the point where the voltage crosses the zero axis. For this purpose a positioning system employing the transducers of FIGURE 1 can be arranged to position the pins 11 relative to the transducers at any one of four points coresponding to the zero crossing positions of the waves $e_A$ and $e_B$ provided the sense of the variation is observed. For more accurate positioning such as corresponding with point P in FIGURE 3A it would be necessary to generate a wave similar to the wave $e_A$ in the neighborhood of the axis crossing to provide the error signal to a servo system which would result in a zero error null at the point P. Such a wave might be of the form indicated by the dotted curve 36 in FIGURE 3A. The curve 36 intersecting the $x$-axis at any desired point P can be derived by the proper combination of the quantities $e_A$ and $e_B$ and thus provide any desired order of resolution in the positioning system by supplying to a servo system error signal inputs corresponding to the waveforms of the type indicated at 36.

Figure 3B:
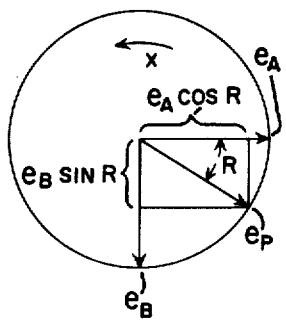
FIGURE 3B is a rotating vector representation of the sinusoidal signals of FIGURE 3A showing the derivation of a combined signal.

To obtain a waveform 36 the portions of $e_A$ and $e_B$ which are to be combined are readily apparent from a consideration of FIGURE 3B which is a rotating vector diagram of the quantities $e_A$ and $e_B$. In a rotating vector diagram of this type the projection of the vectors on the vertical axis represents the R.M.S. value of the illustrated quantity. In relation to the waves of FIGURE 3A in the system of FIGURE 1 a rotation of the vector $e_A$ from its position as shown through one complete revolution corresponds to relative motion of 0.1 inch or one diameter of the pins 11. A vector $e_P$, formed as the vector sum of $e_P \cos R$ plus $e_B \sin R$, can be considered to rotate with the vectors $e_A$ and $e_B$ and displaced by the angle R therefrom. Accordingly the projection of $e_P$ on the vertical axis represents its magnitude at any instant and it can be seen to correspond with the curve 36 which goes through zero magnitude at the point P when the vector $e_A$ has been displaced an angle R in the direction X. Expressed mathematically the relation for $e_P$ is:

$$e_P = e_A \cos R + e_B \sin R$$
$$= E \sin (X - R)$$

Hence $e_P$ will be zero for $X = R$.

Figure 4:
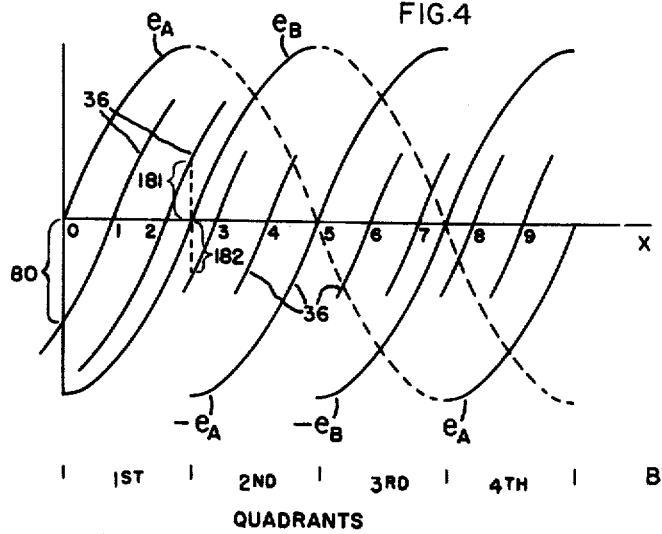
FIGURE 4 is a waveform diagram similar to FIGURE 3A but showing the portions of the signal voltages which are utilized for combination in the four quadrants which make up one cycle of the sinusoids and portions of the resultant waves in the region of zero magnitude.

When using a decimal system it is desirable to produce ten equally spaced curves similar to curve 36 in the interval for one complete cycle of the waveform $e_A$. For this purpose the waveforms $e_A$ and $e_B$ can be combined as indicated in FIGURE 4. The solid curves in FIGURE 4 represent the polarities of the waves $e_A$ and $e_B$ which are utilized in combination to produce the corresponding resultant waveforms 36. The direct combination of $e_A$ and $e_B$ will produce waves with the same magnitude of slope at the axis crossing position and for servo system operation where it is essential that the slope of the curve at the axis crossings have the same sign in each instance. The variations of $\sin R$ and $\cos R$ for 0° to 360° in the expression alone will insure this. Accordingly the quantities $e_A$ and $e_B$ must be combined to produce a given sense of the slope of the composite curves 36 at each of the positions 0–9 in FIGURE 4. The correct slope is obtained by combining the appropriate negative of the quantities $e_A$ and $e_B$ whenever required to produce this result. As indicated in FIGURE 4, at the end of the first quadrant rotation of $e_A$ corresponding to the midway position between digits 2 and 3 the $\cos R$ becomes negative and the sign quantity $e_A \cos R$ is negative. Thus the negative of $e_A$ is employed in the second and fourth quadrants corresponding to the position from midway between digits 2 and 3 to midway between digits 7 and 8. At the halfway point corresponding to digit 5 the quantity $e_B$ is reversed and the negative of $e_B$ is employed to be combined with negative $e_A$ in the third quadrant and, with $e_A$ again reversed at the fourth quadrant negative $e_B$ is combined with positive $e_A$ in the fourth quadrant. With the arrangement the curves 36 are equally spaced over ten intervals within the interval of one period of the wave $e_A$ and the composite curves obtained by combining $e_A$ and $e_B$ have the same slope at each of the digits 0–9.

Figure 5:
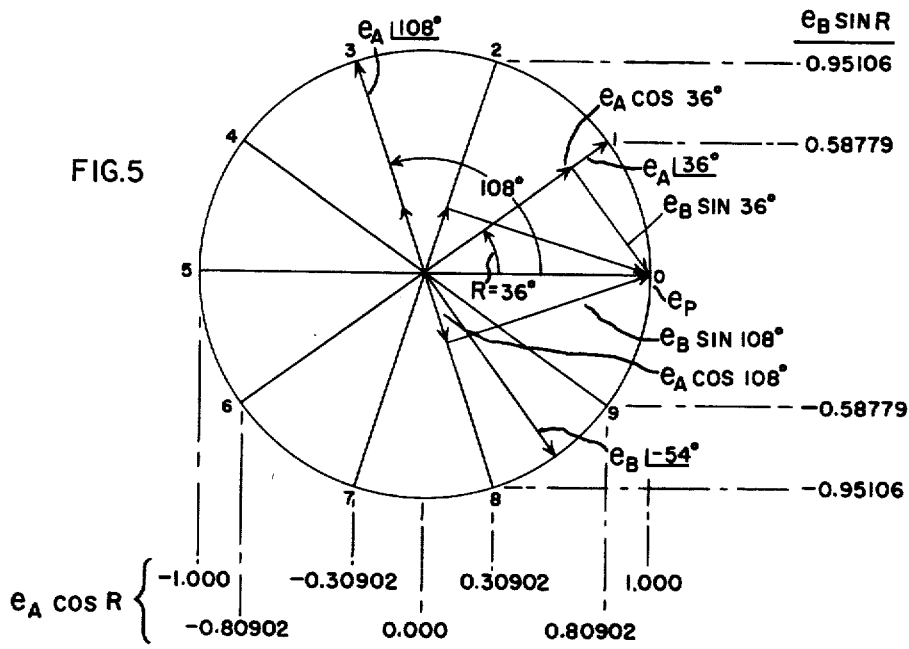
FIGURE 5 is a rotating vector diagram similar to FIGURE 3B showing the conditions for maintaining the error signal at zero magnitude for all digital positions.

The combination of the portions $e_A$ and $e_B$ in accordance with the cosine and sine of the angle R respectively is indicated in FIGURE 5 which again is a rotating vector diagram. In FIGURE 5 the ten equal increments of the angle R to constitute one complete rotation are indicated and numbered 0–9 inclusive. Also shown in FIGURE 5 are the cosine component factors for $e_A$ obtained as the horizontal components of the vectors at each of the positions 0–9 and the sine factors of $e_B$ obtained as the vertical components of the vectors for the positions 0–9. To derive the servo control potential corresponding to the waves 36 in FIGURE 4 the portions of the waves $e_A$ and $e_B$ which are combined are in each case cosine and sine respectively of the angle to which the vector $e_A$ moves. As indicated for the vector $e_A$ at position 1 corresponding to a rotation through 36° the quantity $e_A \cos 36°$ is combined with the quantity $e_B \sin 36°$ to produce the vector $e_P$ lying along the horizontal axis at zero. In each instance the combination of the appropriate cosine quantity of $e_A$ and the sine quantity of $e_B$ with the reversal in sign as indicated in FIGURE 4 will produce for all positions of $e_A$ at the digital positions 0–9 the corresponding vector $e_P$ at the position zero as shown. Accordingly the quantity $e_P$ is an error voltage suitable for operating a servomechanism to drive the mechanism to a null position corresponding to input data for any one of the digital positions 0–9. When the quantities $e_A \cos R$ and $e_B \sin R$ are combined the resultant voltage $e_P$ will be of magnitude and sense which will tend to drive the position of the controlled mechanism to the selected position which will make $e_P$ zero.

Figure 6:
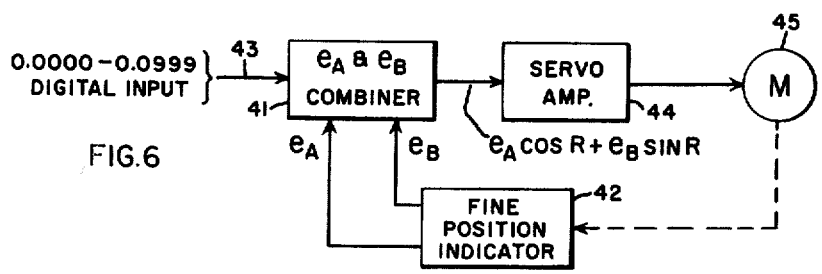
FIGURE 6 is a block diagram of a servo control system utilizing error signals derived as described for FIGURE 5.

In FIGURE 6 a servo system is shown for achieving control in accordance with the invention. A combiner 41 has applied thereto the voltage $e_A$ and $e_B$ from a position indicator 42 which may supply the voltages $e_A$ and $e_B$ in any suitable manner such as the manner shown in FIGURES 1 and 2, for example. The combiner 41 has a data input 43 which may be a manual switch device or a tape reader or other form of data input means for selecting the decimal quantity to which the servo system is to be adjusted. It will be understood that a coarse position indicating device may be employed in any manner known in the art to position the servomechanism at the approximate location of the desired position. Such a device may take the form of a system which counts the number of pins 11 over which the mechanism is traversed and stops the relative motion after a predetermined number of pins have been traversed. At this point the system in accordance with the present invention provides for further accuracy by providing positioning over a distance corresponding to one diameter of a pin 11 in one thousand steps digitally selected by the digital input means 43. The output of the combiner 41 is the quantity $e_A \cos R$ plus $e_B \sin R$ which quantity when applied to a servo amplifier 44 drives a servo motor 45. The motor 45 is connected to produce relative motion between the pins 11 and the transducers 12–15 in FIGURE 1 and thus operates the positioner 42 to produce a null and reduce the input signal to the servo amplifier 44 toward zero.

Figure 7:
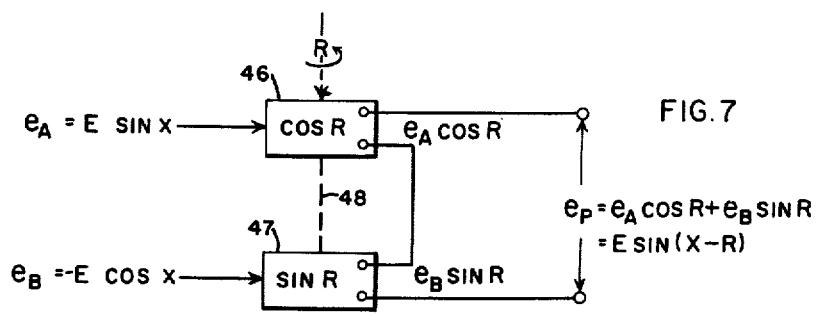
FIGURE 7 is a block diagram of one form of apparatus for deriving a position error voltage signal.

In FIGURE 7 an embodiment of the invention is shown in which a resolver 46 has applied as an input voltage the quantity $E \sin X$ which is equal to $e_A$. A second resolver 47 has an input electrical quantity $e_B$ which is equal to minus $E \cos X$. Each of the resolvers 46 and 47 is a synchro type device having a mechanical input in the form of a shaft rotation 48 to produce an output corresponding to a sine or cosine of the angular setting of the shaft 48. Thus the device 46 produces an output $e_A \cos R$ and the output of the device 47 produces an output $e_B \sin R$. Connecting the outputs as shown the combined output of the devices 46, 47 will be:

$$e_P = E \sin (X - R)$$

Thus the quantity $e_P$ can be obtained as a continuous function from resolving synchro devices 46, 47 with the resolvers 46, 47 providing the proper sign for the quantities $\cos R$ and $\sin R$.

Figure 8:
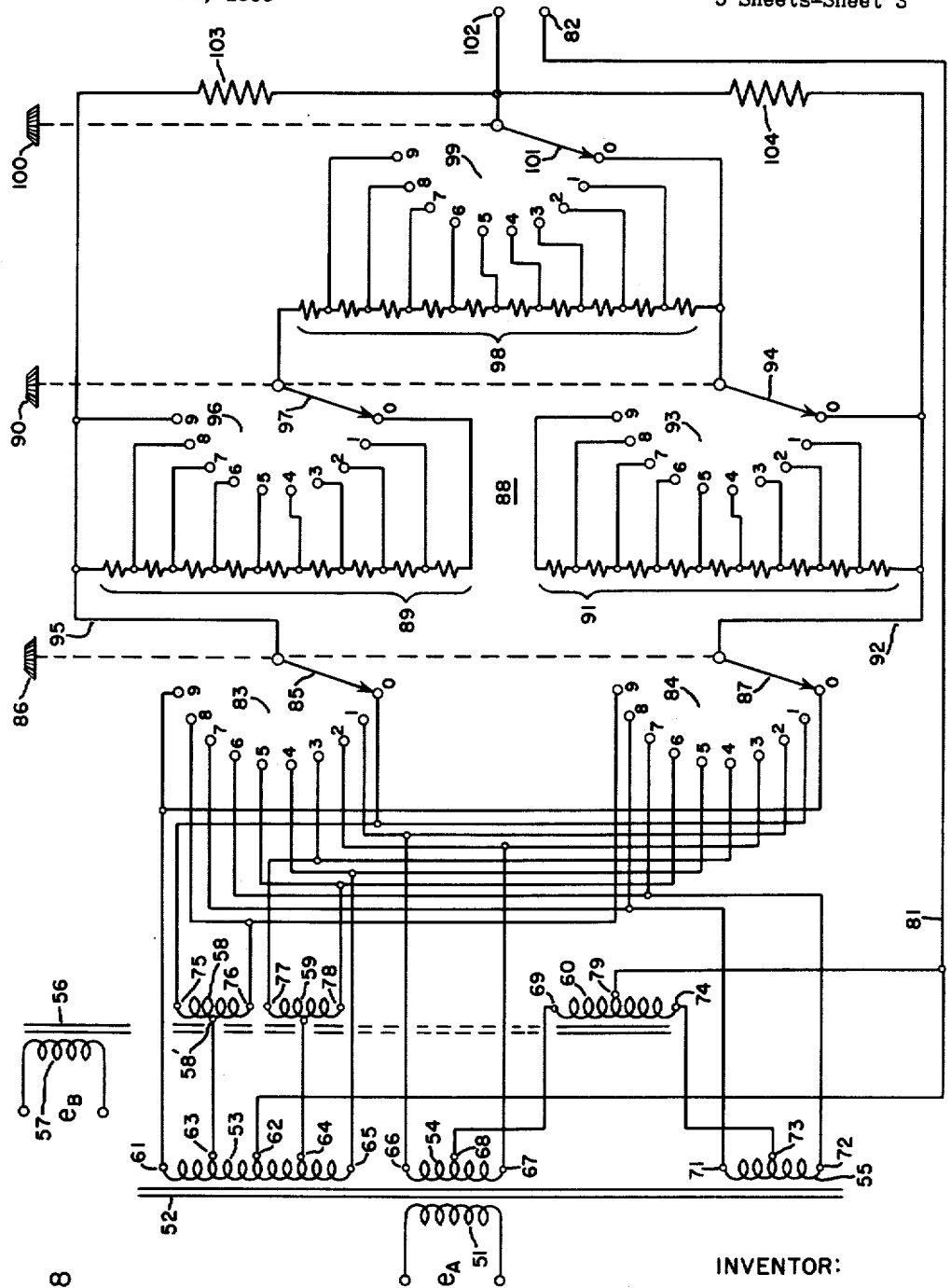
FIGURE 8 is a schematic wiring diagram of a preferred embodiment of the invention for deriving a position control signal.

A preferred embodiment of the present invention is shown in FIG. 8 which supplies the voltage $e_A$ to a primary winding 51 of transformer 52 which has secondary windings 53, 54, 55. A second transformer 56 has three secondary windings 58, 59, 60 and a primary winding 57 to which is applied the voltage $e_B$. The secondary 53 of transformer 52 is accurately wound to provide between end terminal 61 and center tap 62 a voltage which is exactly equal and in phase with the input voltage $e_A$. The intermediate taps on the secondary winding 53 supply voltages relative to the tap 62 which are the decimal portions of the voltage $e_A$ equal to $e_A \cos 36°$ at tap 63 and the negative or out of phase voltage of the same magnitude at the tap 64. At the end terminal 65 a voltage exactly equal to the input voltage $e_A$ but 180° out of phase therewith is obtained. The secondary winding 54 supplies at end terminal 66 a portion of $e_A$ equal to $e_A \cos 72°$ and at terminal 67 an equal magnitude voltage 180° out of phase therewith equal to $e_A \cos 108°$. A center tap 68 of the winding 54 is connected to an end terminal 69 of the secondary winding 60. The secondary winding 55 produces voltages equal in magnitude and phase to the voltages obtained from secondary winding 54 and supplies at tap 71 a voltage equal to and in phase with the voltage of the tap 66 of winding 54 and at tap 72 a voltage equal to and in phase with the voltage at tap 67 of winding 54. A center tap 73 is connected to an end terminal 74 of the secondary winding 60.

The secondaries of the transformer 56 supply voltage components of the voltage $e_B$ which correspond to the sine of the angles as indicated in FIGURE 5. Secondary 58 has end terminals 75 and 76 which supply relative to the center tap 58' respectively the fraction of $e_B$ equal to $e_B \sin 36°$ and the negative of that quantity 180° out of phase with $e_B$. The secondary 59 supplies voltage identical with that of the secondary 58 and at terminals 77 supplies an in phase component and at terminal 78 an out of phase component in magnitude equal to $e_B \sin 36°$. The winding 60 produces at terminal 69 a voltage equal to $e_B \sin 72°$ and an equal magnitude voltage at the terminal 74 out of phase with $e_B$. A center tap 79 is connected in common with the center tap 62 via line 81 to an output terminal 82.

With the interconnection of the transformers 52 and 56 as shown and described, it is possible to select the appropriate portions of the voltages $e_A$ and $e_B$ and combine them with the appropriate phase as explained in connection with FIGURES 3B, 4 and 5. The combined voltage will represent one of the digital portions 0–9 on the X axis of FIGURE 4. For this purpose a pair of ten position selector switches 83, 84 are provided. The switch 83 has a rotor contact 85 which can be selectively positioned at 10 different stator contacts, numbered 0–9, by means of control 86. As previously set forth the control 86 can be a manual control or may be controlled by the output of a data reader of any desired form. The switch 84 has a rotor contact 87 which successively contacts ten stator contacts numbered 0–9. The rotors 85 and 87 are ganged for synchronized rotation. The interconnection of the contacts 0–9 of switches 83 and 84 is such that rotor 87 is connected to the appropriate portions of the secondary windings of transformers 52 and 56 corresponding to the $e_A \cos R$ and $e_B \sin R$ components indicated for the ten angular positions shown in FIGURE 5. The corresponding contacts of switch 83 are connected such that rotor 85 is connected to the same combination of secondary windings but one position in advance of the corresponding windings connected to rotor 87. Thus the potential difference between rotors 87 and 85 will always be the potential between two adjacent waves 36 in FIGURE 4 derived in each instance from the appropriate cosine and sine components of $e_A$ and $e_B$ respectively. For example, the rotor 87 in zero position is connected to terminal 61 of secondary 53 and is at a potential equal to $e_A$ relative to the center tap 62 and the common output terminal 82. The rotor 85 in zero position is at a potential made up of a portion of $e_B$ appearing between terminal 75 and the center tap 58' of winding 58 and the potential between terminals 63 and 62 of winding 53. These two potentials combine to produce the composite wave 36 passing through the position 1 in FIGURE 4. The potential difference between rotors 87 and 85 therefore corresponds to the vertical distance 80 shown in FIGURE 4 between the wave $e_A$ and the wave 36 passing through zero at position 1 on the X axis. In similar manner for any of the other positions 0–9 of the rotors 86 and 85 the potential difference therebetween will be that corresponding to the vertical distance between the corresponding wave forms 36 through the adjacent digits on the X axis in FIGURE 4.

To interpolate between the digital positions on the X axis in FIGURE 4 the apparatus of FIGURE 8 connects the rotors 85 and 87 to the opposite ends of a voltage divider generally designated 88. The divider 88 comprises nine serially connected resistors 89 and a second set of nine serially connected resistors 91. One end terminal of the serially connected resistors 91 is connected by lead 92 to the rotor 87 and the junctions of the resistors 91 and the remaining free end terminal are connected in sequence to the 0–9 stator contacts of a switch 93 which are selectively contacted by a rotor contact 94. The set of resistors 89 has one end terminal connected by lead 95 to the rotor 85 and the junction of the resistors 81 and the remaining end terminal are connected successively to the 0–9 stator contacts of a switch 96 which are selectively contacted by a rotor contact 97. The switches 93 and 96 have their rotors 94 and 97 ganged for simultaneous rotation. Connected between the rotors 94 and 97 is a voltage divider 98 made up of ten serially connected equal resistors.

The resistors in the voltage divider sets 89 and 91 are all of the same value and may be, for example, each equal to ten thousand ohms. For this arrangement the total resistance of the voltage divider 98 may be equal to the value of the individual resistors in the sets 89 and 91. This proportioning of the values of resistors 89, 91 and 98 will provide a potential between the rotors 94 and 97, and hence across the voltage divider 98, equal to the decimal voltage increment between the contact at which the rotor 94 is set and the next succeeding higher numbered contact. The voltage appearing across voltage divider 98 is further resolved into ten decimal increments by connecting the junctions of the resistors 98 to the respective 0–9 stator contacts of a switch 99. The contacts 0–9 of switch 99 are contacted selectively by a rotor contact 101 the potential of which appears at output terminal 102. The rotor 101 is selectively positioned by means of a control 100 which is similar to that of controls 86 and 90 and can be either manually operated or controlled from the output of a data sensing device.

The operation of the system of FIGURE 8 will now be apparent and will only be summarized briefly. The voltages $e_A$ and $e_B$ applied to the primary windings 51 and 57 respectively develop in the secondary windings associated with transformers 52 and 56 the desired cosine and sine magnitude components at the various taps shown and described herein. The transformers 52 and 56 preserve the vectorial nature of the input signals and thus produce the appropriate phase reversals of the voltages $e_A$ and $e_B$ without further structure specifically being required for this function. The selector switches 83 and 84 operated by control 86 select the appropriate sine and cosine values for the first digit of the decimal portion of the voltage difference between $e_A$ and $e_B$ corresponding to one of the positions 0–9 on the X axis in FIGURE 4. This voltage appearing between rotors 87 and 85 is further resolved by a second place decimal digit selected by the control 90 which operates the rotors 94 and 97 of switches 93 and 96 respectively. The voltage appearing between the rotors 94 and 97 is resolved into a third decimal digit selected by the control 100 rotating the rotor 101 of switch 99. The potential appearing on rotor 101 is the output voltage appearing at output terminal 102 relative to the terminal 82 and represents the departure of an actual position from a commanded position which departure can be resolved into one thousand equal increments.

When interpolating between two points on a sine wave with a linear device such as the voltage divider 89, 91 and 98 a slight error is introduced and it may be found desirable to compensate for this by the addition of the resistors 103 and 104. Resistor 103 is connected from the output terminal 102 to the rotor 85 and resistor 104 is connected from the output terminal 102 to rotor 87. For the previously given exemplary values of the resistors 89, 91 and 98 the values of resistors 103 and 104 would be approximately 1.5 megohms for each resistor. For any particular application the values of all the resistors employed may be selected for optimum linearity of the second and third place decimal voltage division determined by the setting of the controls 90 and 100.

Figure 9:
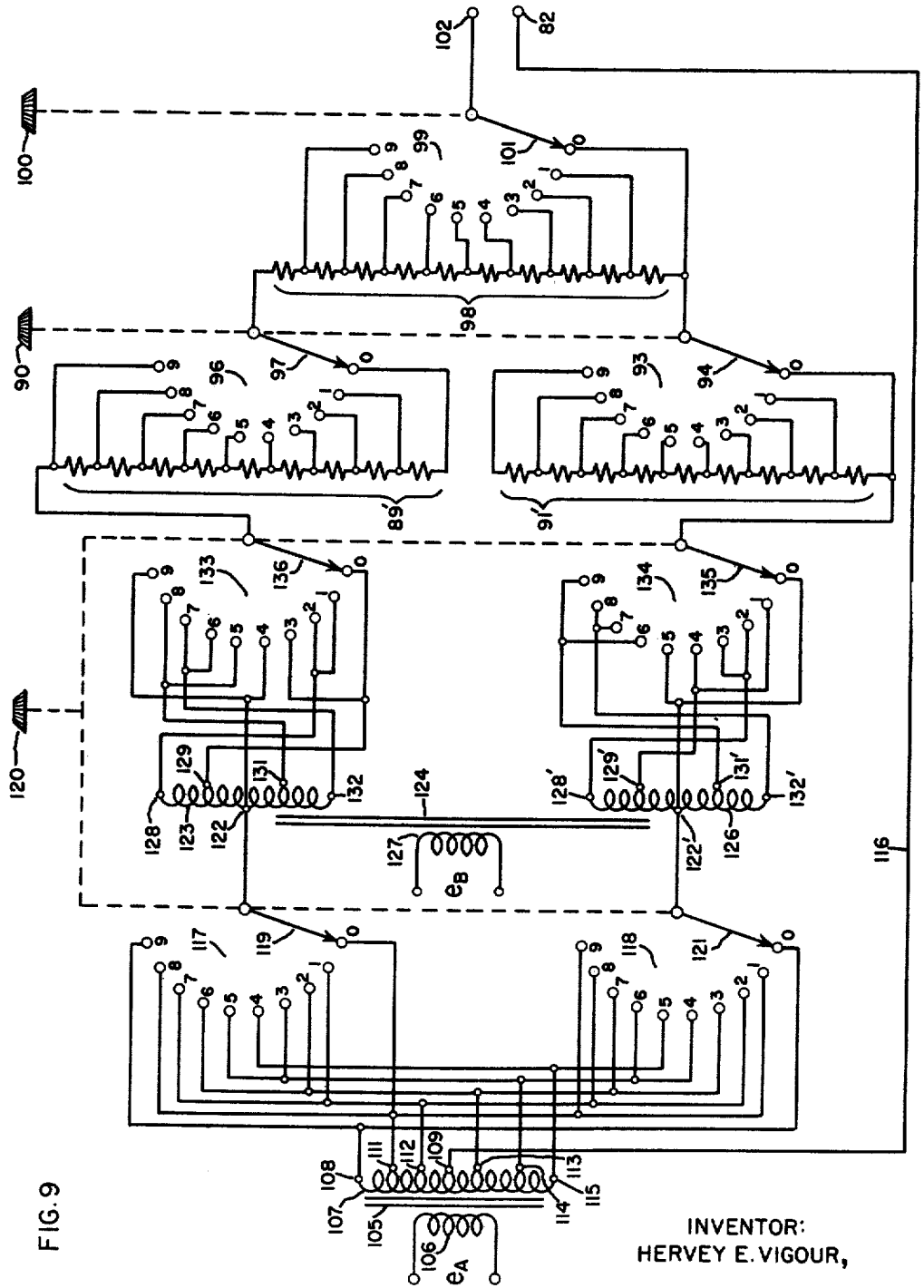
FIGURE 9 is a schematic wiring diagram of a modification.

A modification of the invention is shown in FIGURE 9 in which tapped transformers are employed in conjunction with selector switches for developing the error voltage $e_P$ for each of the first decimal place digits 0–9 in accordance with the invention. In FIGURE 9 a transformer 105 has a primary winding 106 to which is applied the alternating voltage $e_A$ to develop in a secondary winding 107 the cosine magnitude components of $e_A$ corresponding with those shown in FIGURE 5. For this purpose an end terminal 108 develops the voltage $e_A$ relative to a center tap 109 while tap 111 develops the voltage equal to 0.80902 $e_A$. The tap 112 develops a voltage equal to 0.30902 $e_A$ and the corresponding taps 113 and 114 develop equal but opposite phase voltages to those in taps 112 and 111 respectively. End terminal 115 produces a voltage equal to $e_A$ but 180° out of phase therewith. The center tap 109 is connected by lead 116 to the output common terminal 82.

A pair of selector switches 117, 118 are provided for selecting the voltage between adjacent taps of the transformer secondary winding 107. For this purpose the 0–9 stator contacts of switch 118 are connected respectively to the taps of the secondary winding 107 starting with the upper end terminal 108 and proceeding downwardly to the other end terminal 115. The stator contacts 0–9 of switch 118 are also connected to the respective stator contacts of switch 117 with the connection in each instance being to the next higher numbered stator contact in switch 117. The switch 117 has a rotor contact 119 and the switch 118 has a rotor contact 121. The rotors 119 and 121 are ganged for simultaneous rotation under the control of an input device 120 which may be a manual control or the output of a data reading device. With the connection of the switches 117 and 118 as shown the potential on the rotor 121 will be the cosine component of $e_A$ for a particular stator setting and the potential on the rotor 119 will be the cosine component of $e_A$ for the next higher stator setting.

To combine the cosine components of $a_A$ in accordance with the invention the rotor 119 is connected to the center tap 122 of a secondary winding 123 of a transformer 124. The rotor 121 is connected to the center tap 122′ of a secondary winding 126 of the transformer 124. The transformer 124 has a primary winding 127 to which is applied the alternating voltage $e_B$. Each of the secondary windings 123 and 126 has tapped outputs and end terminals to supply the sine components of $e_B$ as required. Thus terminals 128 and 128′ each supply a voltage equal to 0.95106 $e_B$ relative to the center taps 122 and 122′ respectively. In similar manner relative to the center taps 122 and 122′ the two secondaries 123 and 126 have taps 129 and 129′ each supplying a voltage equal to 0.58779 $e_B$ taps 131 and 131′ each supplying a voltage equal to $-0.58779$ $e_B$ and end terminals 132 and 132′ each supplying a voltage out of phase with $e_B$ and equal to $-0.95106$ $e_B$.

The voltages from the secondaries 123 and 126 are selected by means of a pair of ten position switches 133 and 134. The switch 134 has a rotor contact 135 which contacts successively the stator contacts 0–9 which are wired to the taps of secondary 126 in a manner to select the sine components of $e_B$ for the ten digital positions indicated in FIGURE 3. Thus zero position selects sin 0° (i.e., none) of $e_B$ by being connected directly to the center tap 122′. The stator position 1 is connected to tap 129′ to select 0.58779 $e_B$ and the stator position 2 is connected to tap 128′ to select 0.95106 $e_B$. The remaining components of $e_B$ corresponding to the ten digital positions indicated in FIGURE 5 are selected by successive movement of the rotor 135 over the stator contacts 0–9 of switch 134. In similar fashion switch 133 selects from secondary 123 by means of a rotor contact 136 the sine components of $e_B$ corresponding to the digital positions of FIGURE 5 and in each instance one digit position in advance of that voltage selected by the rotor 135 of switch 134. Thus in the zero position the rotor 136 is connected to tap 129 which has the sine voltage for position 1 of FIGURE 5, namely, 0.58779 $e_B$, applied thereto. The rotors 135 and 136 are ganged for common rotation with the rotors 119 and 121 under control of the control means 120. The arrangement thus far described for FIGURE 9 produces a potential difference between the rotors 135 and 136 corresponding to the potential difference between the two adjacent curves 36 of FIGURE 4 corresponding to the digit setting of the control 120.

The potential between rotors 135 and 136 can be resolved two additional decimal places by means of the controls 90 and 100. The control 90 operates the rotors 94 and 97 of the switches 93 and 96 through the positions 0–9 of the respective switches in unison. The switches 93 and 96 are connected to voltage divider resistors 89' and 91' respectively. In this embodiment the resistors corresponding to resistors 103 and 104 in FIGURE 8 have been omitted and the individual values of the resistors in the sets 89' and 91' will accordingly vary slightly in value to provide accurate decimal increments of voltage between the rotors 94 and 97 for all settings thereof. Connected between the rotors 94 and 97 is a voltage divider 98 having the individual resistors connected to the respective stator contacts 0–9 of the switch 99 by which the wiper 101 can select by means of control 100 the desired third place decimal increment of voltage to be obtained at the output terminal 102.

The operation of the embodiment of FIGURE 9 is generally analogous to that of FIGURE 8 with the function of the selector switches 93, 96 and 99 being identical therewith. The selection of the cosine components of $e_A$ and the sine components of $e_B$ is accomplished in a somewhat different manner in FIGURE 9 and employs different transformer constructions for this purpose. The phase reversal of $e_A$ and $e_B$ components which are required in accordance with the invention are obtained by the reversal of the connections to the various taps of the transformer 105 by means of the switches 117 and 118, and transformer 124 by switches 133 and 134 rather than by interconnection of separate windings for this purpose as in FIGURE 8.

In FIGURE 10 an embodiment of the invention is shown employing operational amplifiers and switching circuits to accomplish the objects of the invention without the use of transformer devices. The voltage $e_A$ is connected through resistors 141, 142 and 143 to a predetermined set of stator contacts 0–9 of a pair of selector switches 144 and 145. The voltage $e_B$ is connected through resistors 146, 147 and 148 to another set of stator contacts of the switches 144 and 145. The switch 144 has a rotor contact 149 which supplies input to an operational amplifier 151 which operates by virtue of feedback resistor 152 to produce at its output lead 153 a voltage corresponding to the sum of the voltages effective at the input thereof derived from the rotor 149. The switch 145 has a rotor contact 154 connected to supply the input to an operational amplifier 155 which also has feedback via resistor 156 and produces an output on lead 157 corresponding to the sum of the voltages applied at the amplifier input from the rotor 154. The normalized values of the resistors 141, 142, 143 and 146, 147 and 148 are established inversely as the cosine and sine values of the $e_A$ and $e_B$ components. Thus for resistor 143 having a value of unity, the relative value of resistor 142 would be 1/cos 72° and the value of resistor 141 would be 1/cos 36°; the values of resistors 147 and 148 would be 1/sin 72° and resistor 146 would have the value of 1/sin 36°. In this manner selection of a particular digit by means of the control 86' will produce between output leads 157 and 153 a potential difference in accordance with the waves 36 in FIGURE 4 corresponding to the selected digit and the next adjacent digit. This result is obtained in a manner analogous to that for the embodiments of FIGURES 8 and 9 with the cosine components of $e_A$ and the sine components of $e_B$ appropriately selected by the connection through the resistors 141–143 and 146–148 to the stator contacts of the switches 144 and 145. The output of the amplifier 151 is connected through a normally closed relay contact 150 to a voltage divider 158 which comprises 11 equal valued resistors serially connected. The other terminal of the divider 159 is connected to lead 157. The individual resistors in the divider 158 may be any suitable value such as, for example, ten thousand ohms.

A selector switch 159 has a stator contact 0 (zero) connected to lead 157 and the successively numbered contacts 1–9 connected to the successive junctions of resistors connected from lead 157 toward the other end of the voltage divider as shown. Another selector switch 161 has a stator contact 9 connected to the end of voltage divider 158 which is connected through contact 150 to the lead 153 and the successive contacts 8–0 are connected progressively to the successive junctions of the resistors of voltage divider 158. The selector switch 159 has a rotor contact 162 which is connected to one end of the voltage divider 163. The switch 161 has a rotor contact 164 which is connected to the remaining end of the voltage divider 163. The voltage divider 163 is made up of ten equal valued serially connected resistors connected to respective stator contacts 0–9 of the selector switch 99. The switch 99 supplies output terminal 102 from the rotor contact 101.

For positions corresponding to the first quadrant of the waves shown in FIGURE 4, where the values of $e_A$ and $e_B$ are combined without phase reversal, the system of FIGURE 10 supplies the proper component voltages $e_A \cos R$ plus $e_B \sin R$ across the divider 158. This voltage is resolved into ten equal increments by means of the connections to the switches 159 and 161 wherein the rotor contacts 162 and 164 contact stator terminals on the divider 158. For any setting of the control 90' the voltage between rotors 162 and 164 is equal to the drop across two of the serially connected adjacent resistors. The voltage divider 163 has a total resistance value equal to the resistance value of two of the resistors in divider 158. For example, if the individual resistors in the divider 158 are each ten thousand ohms, the individual resistors in the divider 163 may be equal to 2000 ohms. With these relative values for the resistors of the voltage dividers 158 and 163, the selector switch 99 resolves the voltage between rotor contacts 162 and 164 into ten equal increments corresponding to the third decimal digit selected by the control 100.

As is evident from an examination of FIGURE 4 the apparatus of FIGURE 10 must provide for a reversal of $e_A$ at the end of the first quadrant corresponding to midway between digital positions 2 and 3. The voltage $e_B$ also must be reversed at the end of the second quadrant corresponding to digital position 5. At the end of the third quadrant the existing $e_A$ voltage must be restored by reversing its polarity to reestablish the positive $e_A$ voltage. These phase relations which are obtained by virtue of the transformer characteristics in the previously described embodiments of the invention are provided by the addition in FIGURE 10 of the circuits now to be described.

As previously stated the connection of the output 153 of the amplifier 151 to the voltage divider 158 is made through a normally closed relay contact 150. The contact 150 is controlled by a relay C which also controls normally open contacts 165 and 166. Another relay D operates a normally closed contact 160 and a normally open contact 167. The lead 153 which is normally connected through contact 150 to an end terminal of the voltage divider 156 has this connection interrupted when the relay C is actuated and is then connected through contact 165 and 160 to a junction 168 on the voltage divider 158. When both relays C and D are actuated the lead 153 is connected through contact 165 and contact 167 to a junction 169 on the divider 158. The actuation of relay C also joins the end terminals of the voltage divider 158 to lead 157 by connection through contact 166. In addition to the relays C and D a relay A is provided for reversing the polarity of the voltage $e_A$ and a relay B is provided for reversing the polarity of the voltage $e_B$ which are applied to the respective inputs of the embodiment of FIGURE 10. The contacts of relays A and B for effecting this phase reversal are not shown.

The relay A is controlled by a ten position selector switch 171 having a rotor contact 172 which rotates with the rotors 149 and 154 under the control of the control device 86′. Another selector switch 173 having a rotor contact 174 which rotates with the rotors 162 and 164 under the control of the control device 90′ also is effective to control the energization of the relay A to obtain the desired polarity of $e_A$. The relay B is energized selectively from a rotor 175 of a selector switch 176 which is ganged with the rotors 149 and 154 and the control 86′. The relays C and D are energized selectively in accordance with the setting of a selector switch 177 ganged with control 86′ and a selector switch 178 ganged with control 90′. The operating current for the relays A, B, C and D is obtained from a suitable D.C. source 179 which supplies current to the respective relays selectively in accordance with the setting of selector switches 171, 173, 175, 177, and 178 to establish the polarity conditions shown in FIGURE 4.

The operation of the embodiment of FIGURE 10 with reference to the polarity diagram of FIGURE 4 will now be set forth. As previously stated the circuit as shown in FIGURE 10 provides control voltages at terminals 102 and 82 in accordance with the invention for settings of controls 86′ and 90′ corresponding to the first quadrant of the cycle of $e_A$ and $e_B$ as shown in FIGURE 4. At the end of the first quadrant the setting of controls 86′, 90′ and 100 will be the decimal number 0.0250. This setting will place rotor 172 at stator contact 2 and rotor 174 at stator contact 5 to energize the relay A. The energization of relay A operates contacts, not shown, which reverse the polarity of the voltage $e_A$ applied to the resistors 141, 142 and 143. As is apparent from the interconnection of the switches 171 and 173, relay A will remain energized for all settings from 0.0250 to 0.0749. For control settings corresponding to the decimal 0.0750 to 0.0999 relay A will be deenergized. The latter condition corresponds to the fourth quadrant in FIGURE 4 in which $e_A$ without phase reversal is employed.

For settings of control 86′ between the digit 5 and the digit 9 corresponding to the decimal settings of 0.0500 and 0.0999 the rotor 175 will contact the stator contacts 5–9 of the switch 176 to energize the relay B. The relay B operates by contacts, not shown, to reverse the polarity of the voltage $e_B$ applied to the resistors 146, 147, and 148 to correspond to the negative $e_B$ wave shown in FIGURE 4 for the third and fourth quadrants.

The operation of the relays C and D to control the contacts connecting the amplifiers 151 and 155 to the voltage divider 158 effectively converts the voltage divider 158 into a five step voltage divider for the interval 0.0200 to 0.0249 and a second five step voltage divider for the interval from 0.0250 to 0.0299. A similar pair of five step voltage dividers are provided for the intervals from 0.0700 to 0.0749 and from 0.0750 to 0.0799. This operation can be seen from a consideration of the circuit for selector switch settings in these intervals. For a setting of control 86′ at the digit 2, relay C will be energized converting potentiometer 158 into a five step potentiometer between output lead 157 and terminal 168. Terminal 168 has the potential of lead 153 applied thereto through contacts 165 and 160. Hence, for settings of control 90′ at digits 0–4, five increments of the potential between leads 157 and 153 are obtained. This interval corresponds to the range 181 shown in FIGURE 4, since the potential on lead 157 corresponds with the wave 36 passing through digit 2 on the X axis and the potential on lead 153 corresponds substantially with the potential $e_B$ passing through the X axis midway between digits 2 and 3. For settings of control 90′ at digits 5–9 the potentiometer 158 is converted into a five step voltage divider for the potential between lead 153 applied at terminal 169 and the potential on lead 157 which is reversed in polarity due to the polarity reversal of $e_A$ effected by rotor contact 174 of switch 173 for digits 5–9. Thus in FIGURE 4 the modified voltage divider 158 provides five steps in the region corresponding to 182. A similar operation occurs in the region for control 86′ set at digit 7 and control 90′ set for digits 0–4 and digits 5–9 respectively. For these settings the operation of potentiometer 158 is with respect to the potentials derived from minus $e_B$ and minus $e_A$ in the third quadrant and the restored positive phase of $e_A$ for the fourth quadrant. In each case the third significant decimal is a digit selected by the control 100 rotating the rotor 101 to ten positions on the voltage divider 163, thereby providing three decimal place resolution of the position potential at the output terminals 102 and 82.

From the foregoing description of the various embodiments of the invention, it will be apparent that the present invention provides an extremely accurate data system and means for deriving signals which represent position or other data with extremely high resolution. The circuits in accordance with the invention are capable of resolving the coarse input data by three additional decimal places and supply an error signal of magnitude and sense for controlling a servomechanism relative to any resolved point in the range of operation.

While the invention has been disclosed with reference to particular embodiments, it is to be understood that many modifications may be made by persons skilled in the art without departing from the spirit of the invention or from the scope of the claims.

What I claim as new and desire to secure by Letters Patent of the United States is:

1. A servo positioning system comprising means for generating a pair of position signals which vary as sine and cosine functions with one cycle of said signals corresponding to a predetermined range of positions of said system, means for deriving a portion of said sine function proportional to the cosine of a given angle, means for deriving a portion of said cosine function proportional to the sine of said angle, means for combining said portions to produce a signal which varies as the sine of the difference between the angular position of said system in said cycle and said given angle, and means responsive to said last named signal for positioning said system to reduce said difference to zero.

2. Apparatus according to claim 1 including means for selecting said given angle to correspond to one of a plurality of predetermined positions in said cycle.

3. Means for generating a signal in accordance with the sine of a difference angle comprising a cosine resolver, a sine resolver, means for supplying to said cosine resolver a signal that varies as the sine of a first angle, means for supplying to said sine resolver a signal that varies as the cosine of said first angle, means for operating both of said resolvers to resolve said respective input quantities in accordance with a second angle, and means for combining the outputs of said resolvers to obtain a signal which varies as the sine of the difference between said first and second angles.

4. A digital position control system comprising means for generating a first A.C. signal which varies in magnitude and phase as a sine wave for variation in relative position of two objects with one cycle of said sine wave being equivalent to a predetermined relative displacement of said two objects, means for generating a second A.C. signal which varies in magnitude and phase as a cosine wave for said variation in relative position, a first transformer having a primary energized by said first A.C. signal, a second transformer having a primary energized by said second A.C. signal, secondary winding means on said first transformer supplying output voltage portions of said first A.C. signal corresponding to a plurality of cosine values, secondary winding means on said second transformer supplying output voltage portions of said second A.C. signal corresponding to a plurality of sine values, said cosine and sine values being determined as the values at a predetermined number of different angles within a range of 360°, means for selecting said cosine and sine value portions of said first and second A.C. signals respectively for one of said angles, means for combining said selected portions to produce a control signal proportioned to the sine of the difference between said selected angle and the angular equivalent of said relative position of said two objects, and means responsive to said control signal for positioning said objects to reduce said angular difference to zero.

5. A digital position control system comprising means for generating a first A.C. signal which varies in magnitude and phase as a sine wave for variation in relative position of two objects with one cycle of said sine wave being equivalent to a predetermined displacement of said two objects, means for generating a second A.C. signal which varies in magnitude and phase as a cosine wave for said variation in relative position, a first transformer having a primary energized by said first A.C. signal, a second transformer having a primary energized by said second A.C. signal, secondary winding means on said first transformer supplying output voltage portions of said first A.C. signal corresponding to a plurality of cosine values, secondary winding means on said second transformer supplying output voltage portions of said second A.C. signal corresponding to a plurality of sine values, said cosine and sine values being determined as the values at a predetermined number of different angles within a range of 360°, means for selecting said cosine and sine value portions of said first and second A.C. signals respectively for two of said angles, means for combining said selected portions for each said angle value to produce two control signals each proportional to the sine of the difference between said respective selected angle and the angular equivalent of said relative position of said two objects, selective means for combining said two control signals to produce an intermediate third control signal, and means responsive to said third control signal for positioning said two objects at a corresponding intermediate position between the positions represented by said two selected angles.

6. In a digital position control system in which variation in relative position of two objects between two predetermined positions produces first and second A.C. signals the magnitude and phase-polarity of which vary between said two positions as the amplitude and polarity of a cycle of a sine and cosine wave respectively, means for generating an A.C. control signal at any selected digital position intermediate said two positions which varies in magnitude and phase-polarity relative to said selected digital position as a sine wave which has a zero value at said selected position comprising a first transformer having a primary winding energized by said first A.C. signal, a first secondary winding on said first transformer for supplying two pairs of voltages phase-opposed relative to a center tap and proportionally related to said first A.C. signal by factors of unity and cos 36°, two additional secondary windings on said first transformer each supplying voltages phase-opposed relative to their respective center taps and proportionally related to said first A.C. signal by a factor cos 72°, a second transformer having a primary winding energized by said second A.C. signal, a first secondary winding on said second transformer supplying a pair of voltages phase-opposed relative to a center tap and proportionally related to said second A.C. signal by a factor sin 72°, two additional secondary windings on said second transformer each supplying voltages phase-opposed relative to their respective center taps and proportionally related to said second A.C. signal by a factor sin 36°, a selector switch having a rotor contact for selectively contacting ten stator contacts, interconnections between said secondary windings and said stator contacts for supplying to each stator contact respectively the cosine and sine components of said A.C. signals corresponding to one of ten angular increments of 36°, the polarity of said components being determined by the sign of the cosine and sine functions in the four quadrants covered by said increments, a first output terminal coupled to said rotor contact and a second output terminal connected to a lead joining the center taps of said first secondary windings of both said transformers.

7. Apparatus according to claim 6 and including a second selector switch having a rotor contact for selectively contacting ten stator contacts and ganged for rotation with said rotor contact of the first recited selector switch, said second selector switch being connected and operated to provide on said rotor contact thereof a potential equal to that which would be present on the rotor contact of said first selector switch at the next adjacent stator contact position, and a voltage divider connected between said rotor contacts, said first output terminal being coupled to a point on said voltage divider.

8. Apparatus according to claim 7 in which said voltage divider comprises a first set of ten serially connected resistors each of one predetermined value and having one end terminal of said set connected to one of said rotors, a second set of ten serially connected resistors each of said one value and having one end terminal of said second set connected to the other of said rotors, a pair of ganged ten position selector switches each having a rotor contact for selectively contacting ten stator contacts, connections respectively joining the end terminals and junctions of the resistors of said first set to the stator contacts of one of said pair of switches, connections respectively joining the end terminals and junctions of the resistors of said second set to the stator contacts of the other of said pair of switches, ten serially connected equal valued resistors having a total resistance equal to said one value connected between said rotor contacts of said pair of switches, a final ten position selector switch having a rotor contact for selectively contacting ten stator contacts, connections respectively joining one end terminal and the junctions of said equal valued resistors to the stator contacts of said final selector switch, and a connection between said first output terminal and said rotor contact of said final selector switch whereby operation of said first and second switches selects a first digit, operation of said pair of switches selects a second digit and operation of said final switch selects a third digit for a three digit subdivision of the distance between said two positions.

9. Apparatus according to claim 8 and including a pair of fixed resistors connected between said first output terminal and said rotors of said first and second switches respectively, said fixed resistors compensating for linear output characteristics of said voltage divider.

10. A signal combining circuit comprising a first transformer having a primary and first, second and third center tapped secondaries, said first secondary having taps to supply voltages in the ratios cos 0°, cos 36°, cos 144° and cos 180°, said second and third secondaries supplying voltages in the ratios cos 72°, cos 108°, and cos 252°, cos 288°; a second transformer having a primary and first, second and third secondaries, said first secondary of said second transformer having terminals supplying voltages in the ratios sin 72°, sin 288°, said second and third secondaries of said second transformer supplying voltages in the ratios sin 36°, sin 324°, the voltages in each instance being relative to the respective center taps and of one phase for positive values of said sine and cosine functions and of the opposite phase for negative values of said functions; a selector switch having ten stator contacts and a rotor contact for selectively contacting said stator contacts; a connection between said cos 36° tap and the center tap of said third secondary of said second transformer; a connection between said cos 144° tap and the center tap of said second secondary of said second transformer; connections from said terminals of said first secondary of said second transformer to the center taps respectively of said second and third secondaries of said first transformer; connections from said stator contacts to said secondaries to supply at said stator contacts respectively voltages from both of said transformers in accordance with the sine and cosine values at 36° increments over an interval of 360°; and output means coupled to said rotor contact and the joined center taps of said first secondaries.

11. A signal combining circuit comprising a first transformer having a primary and a center tapped secondary with taps to supply voltages in the ratios cos 0°, cos 36°, cos 72°, cos 108°, cos 144° and cos 180°; a second transformer having a primary and two like center tapped secondaries each with taps to supply voltages in the ratios sin 72°, sin 36°, sin 324° and sin 288°; the voltages in each instance being relative to the respective center taps and of one phase for positive values of said sine and cosine functions and of the opposite phase for negative values of said functions; means for selectively applying voltages from said secondary of said first transformer to the center tap of one of said secondaries of said second transformer in accordance with the cosine values at 36° increments over an interval of 360°; means for selectively applying voltages from said secondary of said first transformer to the center tap of the other secondary of said second transformer in accordance with the cosine values at angles displaced 36° from said increments; means for selectively contacting voltages of said one secondary in accordance with the sine values at said 36° increments; means for selectively contacting voltages of said other secondary in accordance with the sine values at said displaced angles; and output means coupled to said selective means contacting said sine values and the center tap of said secondary of said first transformer.

12. A signal combining circuit comprising first and second input terminals and a common terminal; means for deriving components from said first input terminal in the ratios of cos 0°; cos 32°; cos 72°; means for deriving components from said second input terminal in the ratios of sin 36°, sin 72°; means for selectively combining said components in accordance with the magnitude of the sine and cosine values for ten 36° increments over an interval of 360°; means for selectively combining said components in accordance with said magnitudes at angles displaced 36° from said increments; a ten step selective voltage divider connected between said selective combining means to supply selectively ten equal voltage steps between the potentials determined by combining said components, said ten steps corresponding to a decimal subdivision of said increments; means for reversing the polarity of input signals applied to said first input terminal for said increments and said subdivisions in the second and third quadrants; means for reversing the polarity of input signals applied to said second input terminal for said increments in the third and fourth quadrants; means responsive to said increments being 72° or 252° for converting said voltage divider into two five step voltage dividers; means for deriving output voltages from one of said five step dividers for said increments at 72° and 252° and said voltage divider selective means at any of the first five selective steps; means for deriving output voltages from the remaining five step divider for said increments at 72° and 252° and said voltage divider selective means at any of the last five selective steps and output means coupled to said common terminal and the selected step on said voltage divider.

References Cited in the file of this patent
UNITED STATES PATENTS

| | | |
|---|---|---|
| 2,343,159 | Sias | Feb. 29, 1944 |
| 2,783,422 | Fouassin | Feb. 26, 1957 |

OTHER REFERENCES

Greenwood, Holdam, MacRae, Electronic Instruments, p. 477, FIG. 14.5, McGraw-Hill Book Co., New York, 1948.

UNITED STATES PATENT OFFICE
CERTIFICATE OF CORRECTION

Patent No. 3,083,323                                  March 26, 1963

Hervey E. Vigour

It is hereby certified that error appears in the above numbered patent requiring correction and that the said Letters Patent should read as corrected below.

Column 4, line 15, for "$e_P$", in italics, read -- $e_A$ --, in italics; line 58, for "the", first occurrence, read -- this --; line 62, after "portions" insert -- of --; column 5, line 20, for "voltage" read -- voltages --; column 8, line 47, for "$a_A$", in italics, read -- $e_A$ --, in italics.

Signed and sealed this 12th day of November 1963.

(SEAL)
Attest:
ERNEST W. SWIDER                                      EDWIN L. REYNOLDS Attesting Officer                                    Acting Commissioner of Patents